3,565,649
PROCESS FOR GRINDING PORTLAND CEMENT
James N. Stone, Orange Park, and George H. Eick, Ponte Vedra, Fla., assignors to SCM Corporation, Cleveland, Ohio, a corporation of New York
No Drawing. Continuation-in-part of application Ser. No. 380,691, July 6, 1964. This application May 16, 1968, Ser. No. 729,511
Int. Cl. C04b 13/30
U.S. Cl. 106—94       1 Claim

ABSTRACT OF THE DISCLOSURE

This invention relates to a method of grinding portland cement clinker with an aqueous admix consisting essentially of substantially completely saponified pitch or tall oil rosin or a mixture thereof, having from 5% to 70% total solids to yield an improved cement product. The admix is added with the clinker in an amount sufficient to leave a residue of about 0.005% to about 0.5% by weight of cement product in the resultant cement.

---

This application is a continuation-in-part of our application Ser. No. 380,691 of July 6, 1964, now Pat. No. 3,423,219. Said application is hereby incorporated by reference.

This invention relates to an improved pulverulent portland cement composition that affects and improves such properties as strength and air permeability when compounded into mortar or concrete, and to a process for making the same.

Heretofore, it has been suggested to add fully saponified tall oil pitch in solid dry form to cement clinker during the grinding operation and add an aqueous emulsion of fully saponified tall pitch to plastic concrete mixes as an air entraining agent (see U.S. Pat. 2,510,776). However as noted in the patent such additions of saponified tall oil pitch and similar air entraining agents usually produce about a 15% decrease in the compressive strength of concrete.

We have now discovered that if portland cement clinker is ground with an aqueous dispersion of substantially fully saponified tall oil pitch, instead of grinding clinker with dry tall oil pitch, an improved pulverulent portland cement product is obtained. The improved cement appears to contain an intimately mixed, substantially uniform additive residue for imparting a desirable degree of air entrainment and enhanced water-repellency in concretes and concrete mortars.

A most significant improvement is the fact that mortars made from cement ground with our aqueous dispersion have improved compressive strength over those mortars prepared from conventional cement made with the dry counterpart. In addition to increased strength, our mortars have good air permeability or fineness (Blaine test) as measured according to ASTM C–204–55 and percent cube flow, ASTM C–109–63.

Broadly, our pulverulent portland cement product contains about 0.005 to 0.5 weight percent of diffuse sorbed residuum from an aqueous dispersion containing from about 5% to about 70% by weight of substantially completely saponified tall oil pitch or tall oil rosin or mixture thereof. The cement product is prepared by grinding cement clinker with the dispersion (also referred to as "admix") at a temperature above the boiling point of water at atmospheric pressure. Heretofore, it was believed that a 15% total solids content for the admix was the minimum acceptable for good results. It has now been discovered that good results can be obtained with an admix having as low as 5% total solids content (non-volatile matter remaining when water is evaporated off at atmospheric pressure).

Conventionally, the term "Portland cement" covers various categories of cement such as types for use in general concrete construction and mortar preparation, as well as more specific concrete types for use in particular concrete applications, e.g., for use where high sulfate resistance, high early strength, low heat of hydration, or moderate sulfate action or heat of hydration is required. Consequently, the term as used herein should be construed as including all categories of cement that are associated with such terms. The most common types of portland cement that have been recognized in the U.S. are described in ASTM C 150–63, C 175–61, C 205–61T and C 340–58T.

Tall oil rosin includes mixtures of abietic and pimaric type acids and generally such related isomers as differ from abietic acid in either the number or location of the double bonds, or in the structure of the side chain. The rosin conventionally has an Acid Number between about 150–180. Pitches such as tall oil pitch, for example, can be at least partially composed of compounds formed during distillation such as polymerized resin acids. The Acid Number of tall oil pitch is conventionally not substantially above about 120 and the Saponification Number is generally about 140 or lower.

We have found that blending pitch and rosin to form mixtures can be useful and is suitably accomplished prior to forming the dispersion. Where such mixtures are used, we have found it advantageous from a manufacturing standpoint that they consist of about 55–80 weight percent tall oil rosin and the balance tall oil pitch. Such mixtures can be obtained as a bottoms fraction from controlled tall oil distillation or by blending a distillate rosin fraction with the undistilled pitch fraction. However, for efficiency and economy in cement treating we prefer to use mixtures wherein a preponderant proportion of the mixture consists of tall oil pitch, e.g., 90% or more and even up to 100%.

By a substantially completely saponified tall oil pitch or rosin we mean that the pitch or rosin should be at least 90% saponified. To saponify the pitch or rosin we usually treat with an alkali metal (Group 1 Metal) hydroxide or equivalent such as the carbonate, bicarbonate, sesquicarbonate and oxide, in an amount at least about stoichiometric for completely saponifying the pitch or rosin.

For added storage life of the protective colloid in the admix we can use a pesticide such as a fungicide generally in proportion of about 0.01% to 1.0% of fungicide based on the total weight of the admix. Fungicides which we can and have used include phenyl mercury acetate, "Vancide" (which is the trademark for an aqueous solution of the salts of mercaptobenzothiazole and dimethyldithiocarbamic acid), "Butrol" (a trademark for the following composition: 10% phenylmercuric acetate, 50% potassium orthophenylphenate, and the balance inerts), "Busan 901" (which is a trademark for the mixture of: 12.7% disodium cyanodithiomidocarbonate, 4.8% ethylenediamine, 17.5% potassium N-methyldithiocarbamate, and the balance inerts), and N-(3-chloroallyl) hexaminium chloride, made by reacting hexamethylenetetraamine with a halohydrocarbon. For efficiency and economy we prefer to use about 0.2% of N-(3-chloroallyl) hexaminium chloride.

To be well distributed throughout the cement our admix must be easily and thoroughly mixed during conventional grinding of the clinker. Because the product is in a dispersed state, it blends quickly and efficiently with the cement-clinker in the normal machine pulverizing operations, e.g., by ring-roller milling at about 125° C. with or without subsequent tube milling, or ball milling followed by tube milling, or by compartment milling, both handled conventionally at about 120–130° C. In such operation the use of our admix should not be construed as precluding the addition to the clinker during pulverizing of other desirable or conventional compounds such as gypsum, which is often used at this stage to boost the $SO_3$ content in the cement for retardation of set, or pozzolan for its special properties.

The admix is blended with the cement-clinker as an aqueous dispersion and is, therefore, subject to at least partial dehydration in the clinker grinding at elevated temperature above the atmospheric boiling point of water i.e. above about 100° C., and generally at about 125° C. or higher. Preferably, for efficient grinding, the admix is added directly to the primary grinder, but, if desired, it can be added to the clinker prior thereto. Because of the dehydration we generally describe the clinker after grinding as containing a sorbed residuum from the dispersion. By residuum we mean the ingredients of the admix which are less volatile than water, e.g., pitch of rosin and the alkali metal hydroxide or equivalent. Whether reacted, occluded, absorbed, or adsorbed, we have found it necessary to incorporate from about 0.005–0.5% of such residuum into the cement, calculated on a weight basis of the oven-dried resulting cement. This amounts to about 0.012 to 1.63 parts of admix per part of the clinker and mineral grinding additives such as gypsum. Using less than about 0.005% of the residuum will not provide sufficient admix to ensure the enhanced benefits such as water repellency that the cement imparts to concrete. Using greater than about 0.5 weight percent of such residuum can adversely affect the strength of resulting concrete, reducing it to below tolerable limits. For efficiency in blending and economy of operation we prefer to incorporate about 0.05–0.2% of such residuum; which amounts to about 0.06 to 0.65 part of admix per part of clinker and mineral grinding additives such as gypsum.

The following examples show ways in which the invention has been practiced, but should not be construed as limiting the invention. In this specification all percentages are weight percentages, all parts are parts by weight, and all temperatures are in degrees centigrade unless otherwise specified.

EXAMPLE 1

A 1330 part sample of tall oil pitch was melted in a kettle equipped with a thermometer and stirrer and the temperature stabilized at 130°. A solution of 120 parts of NaOH in 220 parts of water was added to the pitch sample for reaction therewith. During the addition of the solution the temperature in the kettle was held at 90° and after all the NaOH solution had been added the resulting mixture was allowed to cook for 60 minutes at 90° to form a completely saponified colloidal solution.

After reaction, warm water at temperature of 38° was added to the colloidal solution with agitation to reduce the mixture to a 20% total solids content. About 90% of the solids had average particle size of 1–2 microns and less. Based on the total weight of the admix, 0.2% of a fungicide which was N-(3-chloroallyl) hexaminium chloride was added.

Portland cement clinker that had been removed from a kiln and cooled was conveyed to a series of pluverizing mills. Prior to entering the mills, 4% of gypsum rock, based on the weight of the clinker, was added to the clinker. The resulting product entered the mills in batch operation; to a randomly selected batch there was added 0.011 weight percent solids (in the form of the 20% solids aqueous admix), based on the weight of the resulting gypsum-clinker product. The grinding operation reduced the clinker batches to a powder 90% of which passed through a 200-mesh screen, which operation exhibited an economical reduction in grinding time attributable to the admix and additionally blended the additives thoroughly and intimately with the clinker.

Hydraulic cement mortar was made from portions of the treated batch according to the specifications of ASTM C 185–59 and the resulting mortar was checked for air content according to the specifications of ASTM C 185–59. The results are listed in the table below.

Additional of the treated ground clinker portions were used for producing hydraulic cement mortars as described in ASTM C 109–58 and these mortars were tested according to such standards to determine their compressive strength; the results of these tests are listed in the table below.

Percent air entrainment _____ 14.17
Compressive strength p.s.i., 28-day air-cured ____ 7157
Water absorption _____ 4.73

The foregoing procedure gave excellent compressive strength of the motar while producing a desired amount of air entrainment with its particular advantages. Further water absorption was held within good limits.

A propietary compound of substantially hydro-aromatic acids plus fatty carboxylic acids, which compound was derived from a paper manufacture process and alkali neutralized was used in portland cement grinding in a manner similar to that described above in a proportion of 0.008%, on a weight basis of the grinding mixture, and as a 20% solids content aqeuous dispersion. This resulting hydro aromatic-fatty carboxylic acid mixture in portland cement was used to produce mortar, as above, but such mortars had 19.88% air entrainment and exhibited compressive strength after the 28 days of air curing of only 6267 p.s.i. in the test prescribed by ASTM C 109–58, thus considerably below that achieved by the inventive admix.

EXAMPLE 2

Tall oil pitch was treated with NaOH in accordance with the manner described in Example 1 to yield a fully saponified tall oil pitch additive. This pitch additive was divided into two portions. One portion was mixed with water to form an aqueous admix having about 7.2% by weight of tall oil pitch. The other was evaporated to dryness and ground to a fine powder.

Two cement compositions, I and III, were prepared by grinding portland cement clinker with a calculated amount of aqueous admix to yield 0.026% and 0.0127% residuum by weight of cement product, respectively.

Two other cement compositions, I and IV, were prepared by grinding cement clinker with a calculated amount of the solid, dry form, saponified tall oil pitch additive to yield 0.026% and 0.0127% residuum by weight of cement product, respectively.

The analysis of the four cement compositions is as follows:

| | Cement Number | | | |
|---|---|---|---|---|
| | I | II | III | IV |
| | Wt. percent additive dosage treated tall oil pitch | | | |
| | 0.0260 (added wet) | 0.0260 (added dry) | 0.0127 (added wet) | 0.0127 (added dry) |
| Cement composition: | | | | |
| $SiO_2$ | 20.85 | 20.72 | 20.77 | 20.88 |
| $Al_2O_3$ | 5.06 | 5.03 | 5.02 | 5.09 |
| $Fe_2O_3$ | 3.06 | 3.11 | 3.01 | 3.05 |
| CaO | 64.95 | 64.79 | 64.95 | 64.84 |
| MgO | 1.58 | 1.61 | 1.64 | 1.54 |
| $SO_3$ | 2.24 | 2.29 | 2.29 | 2.27 |
| $K_2O$ | .69 | .69 | .69 | .69 |

The four cement compositions were formed into like mortars and like test pieces. These mortars were tested by conventional methods for percent cube flow, air permeability, or fineness, and compressive strength.

The results of these tests, referred to by ASTM testing method, were as follows:

| Cement used | I | II | III | IV |
|---|---|---|---|---|
| Percent mortar air entrainment, ASTM-185-59 | 24.26 | 23.10 | 19.25 | 20.53 |
| Percent cube flow, ASTM C-109-63 | 112.2 | 105.0 | 103.5 | 105.1 |
| Fineness or air permeability, ASTM C-204-55 | 3,197 | 3,173 | 3,201 | 3,102 |
| 28-day compressive strength, ASTM C-109-64; ASTM C-109-63 | 4,377 | 3,933 | 4,883 | 4,648 |

The above table shows that mortars produced from cement wherein the clinker was ground with the aqueous admix surprisingly are somewhat stronger than the corresponding mortars made from cement wherein the clinker is ground with the solid dry form of tall oil pitch. In addition the air permeability of the mortars made from the cement produced by grinding the clinker with the aqueous admix was slightly better than the corresponding mortars.

What is claimed is:

1. In a process for grinding portland cement clinker to yield a pulverulent portland cement product, the improvement which comprises: grinding said clinker at a temperature above the atmospheric boiling point of water with an aqueous admix sufficient for yielding about 0.005–0.5% residue based on the weight of said pulverulent portland cement product, said admix consisting essentially of an aqueous dispersion of saponified pinaceae heavy ends selected from the group consisting of tall oil pitch, tall oil rosin and mixtures thereof, said pinaceae heavy ends being fully saponified, and said admix having from about 5 to about 70% of solids by weight.

References Cited

UNITED STATES PATENTS

| | | | |
|---|---|---|---|
| 2,510,776 | 6/1950 | Gabrielson | 106—94 |
| 3,423,291 | 1/1969 | Stone et al. | 106—94 |

TOBIAS E. LEVOW, Primary Examiner

J. COOPER, Assistant Examiner

U.S. Cl. X.R.

106—102